No. 765,975. PATENTED JULY 26, 1904.
E. P. HOOLEY.
APPARATUS FOR THE PREPARATION OF TAR MACADAM.
APPLICATION FILED NOV. 3, 1902.
NO MODEL.
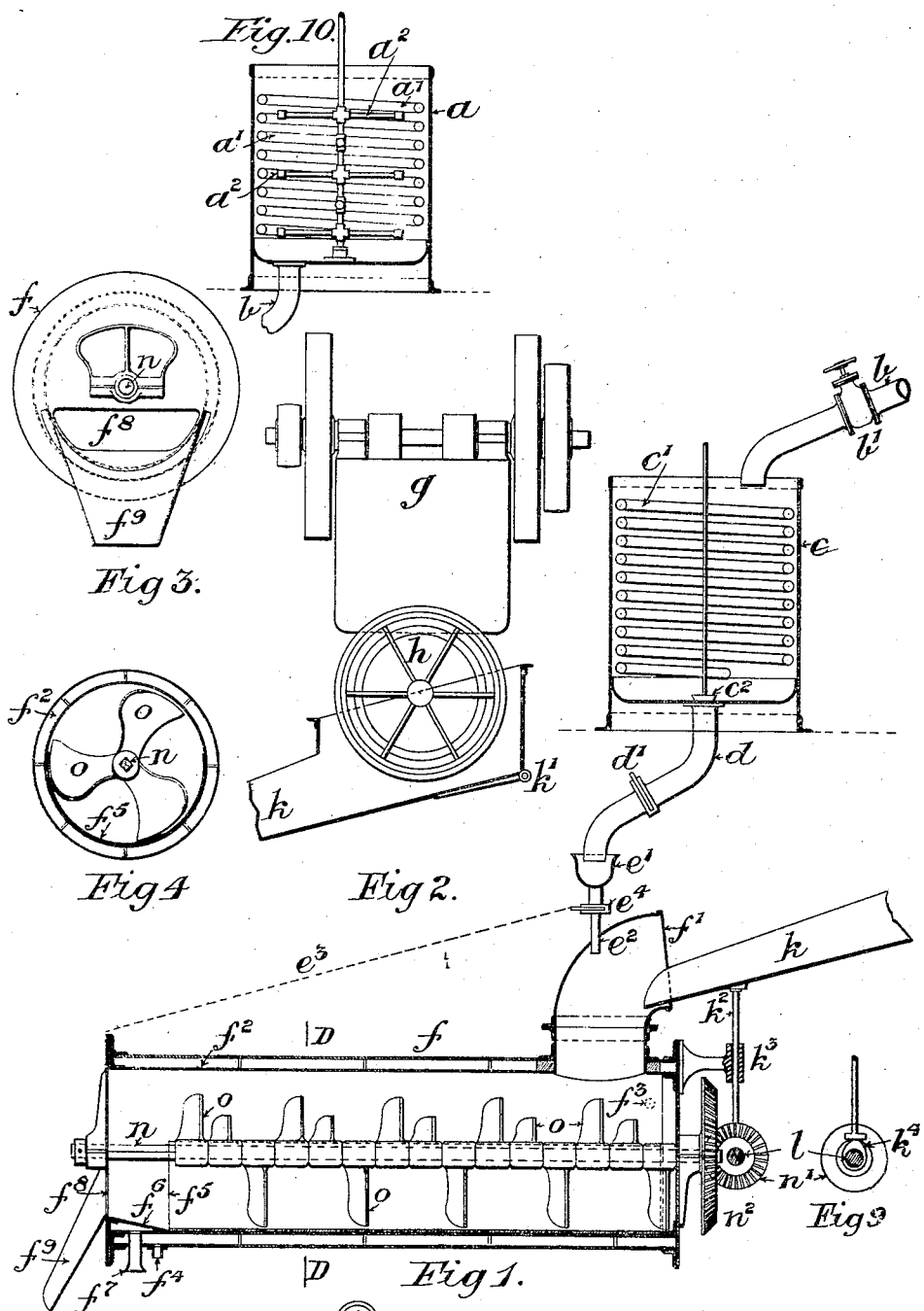
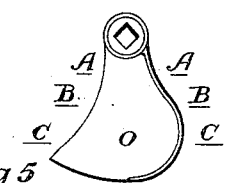

No. 765,975. Patented July 26, 1904.

UNITED STATES PATENT OFFICE.

EDGAR PURNELL HOOLEY, OF NOTTINGHAM, ENGLAND.

APPARATUS FOR THE PREPARATION OF TAR MACADAM.

SPECIFICATION forming part of Letters Patent No. 765,975, dated July 26, 1904.

Application filed November 3, 1902. Serial No. 129,845. (No model.)

*To all whom it may concern:*

Be it known that I, EDGAR PURNELL HOOLEY, a subject of the King of Great Britain, and a resident of Nottingham, in the county of Nottingham, England, have invented new and useful Improvements in Apparatus for the Preparation of Tar Macadam, of which the following is a specification.

This invention has for its object improvements in the construction and arrangement of improved apparatus for the preparation of tar macadam of the kind used for making and repairing roads and foot-paths and which may also be used for tar concrete and other similar purposes.

At the present time the slag, stones, or other material used for the macadam are, if necessary, broken into pieces of suitable sizes and thoroughly dried. The material is then usually mixed by hand-labor with heated tar or a tar mixture until all the pieces of the material are covered with the coating mixture. This method of preparing tar macadam is costly to carry out and the tar macadam is unsatisfactory, because a thin coating only adheres to the material, and this has not sufficient adhesive properties to form a good "bind" between the pieces of the macadam. Roads made of this macadam are affected by atmospheric conditions, and tar when used by itself becomes brittle when cold.

In the drawings which accompany this specification and referred to in the following detailed description of the apparatus, Figure 1 is a sectional side elevation of a part of the improved apparatus. Fig. 2 is a continuation of the sectional side elevation of the improved apparatus shown in Fig. 1 and shows the stone-breaking machine and screen. Fig. 3 is an end elevation of the coating-machine. Fig. 4 is a section on the line D D, Fig. 1. Fig. 5 is an elevation of one of the revolving arms of the coating-machine. Fig. 6 is a section on the line A A, Fig. 5. Fig. 7 is a section on the line B B, Fig. 5. Fig. 8 is a section on the line C C, Fig. 5. Fig. 9 is the elevation of the cam used for agitating the chute, and Fig. 10 is a sectional elevation of the mixer and is a continuation of Fig. 1.

The coating mixture is placed in a mixer $a$, heated by the steam-coil $a'$ and agitated by arms $a^2$, which are revolved by mechanical means. The ingredients of the mixture are thus thoroughly mixed together and kept at a uniform temperature during such process, such temperature being varied according to requirements. The mixed ingredients then flow through the pipe $b$ and valve $b'$ to a reservoir $c$, which is provided with a steam-coil $c'$ for maintaining the temperature of the mixture and a plug or valve $c^2$ for closing the outlet-pipe $d$, which is also fitted with a valve $d'$ for regulating the flow of the mixture to a distributing-trough $e'$, when a number of coating or tarring machines $f$ are used, or to the coating or tarring machine itself when one only is used. When a number of coating or tarring machines are used in connection with the same reservoir, the distributing-trough $e'$ is fitted with a pipe $e^2$ to each machine, and these pipes are fitted with valves $e^4$, which can be opened and closed from the end of the machine by means of a rod, chain, or other connection $e^3$.

The material to be coated or tarred is thoroughly dried and is passed through a stone-breaking machine $g$, of any ordinary type. The dried and broken material is then passed through a selective screen $h$, and the different-gaged pieces are delivered to separate chutes $k$, which are hinged to fixed supports at $k'$ and their free ends supported by rods $k^2$, which slide in suitable guides $k^3$ and are raised and lowered by suitable cams $k^4$ or their equivalents on the driving-shaft $l$, this oscillation of the chutes insuring a regulated supply of material to the coating or tarring machines. The coating-machine $f$ is circular in section and on the outside is surrounded by a steam-jacket $f^2$, provided with suitable stays, a steam-inlet $f^3$, and an outlet $f^4$ for condensed steam, while the lower portion of the inside is provided with a renewable bottom $f^5$. The coating-machine is provided with the inlet $f'$, into which the lower or free end of a chute $k$ extends. I also usually provide several coating-machines, one for each chute $k$, and consequently one for each grade of material delivered from the screen. At the outlet end of the machine there is a grating $f^6$, over which the coated or tarred material is forced to pass, so that any excess of coating or tarring mixture can be separated from the macadam, and such excess is delivered from the machine and is collected at the outlet-pipe $f^7$, while the coated or tarred material is delivered from the machine through the opening $f^8$ and by chutes $f^9$ is guided into trucks or other receptacles. Inside the machine there is a square shaft $n$, which is continuously rotated by the gear-wheels $n'$ and $n^2$ from the driving-shaft $l$, and mounted upon the shaft $n$ there are a number of arms $o$, each placed at an angle of one hundred and twenty degrees with the preceding arm and of the shape and section shown in Figs. 5, 6, 7, and 8, these arms being so shaped that their revolution mixes the material and advances it toward the delivery end of the machine, thus insuring a continuity of the coating or tarring operation and delivery of the coated or tarred material. The machine may be horizontal, as shown, or inclined toward either end, according to the nature of the material operated upon.

The coating or tarring mixture is preferably composed of tar, pitch, Portland cement, and resin in substantially the following proportions: tar, forty gallons, or 92.56 per cent., by weight; pitch, twenty-eight pounds, or 5.79 per cent., by weight; Portland cement, two pounds, or 0.41 per cent., by weight; resin, six pounds, or 1.24 per cent., by weight.

The tar is first placed in the mixer $a$ and gradually raised to a temperature of about 212° Fahrenheit, at which temperature it is maintained throughout the whole operation. The other ingredients are added after the tar has been raised to the desired temperature and are thoroughly mixed by the arms $a^2$, which are mechanically rotated.

Tar macadam prepared by the means herein described is thoroughly coated with an adhesive mixture which also penetrates into the material coated, and when used for road-making the separate pieces of the macadam bind well together, and the road is not affected by atmospheric conditions.

What I claim as my invention, and desire to protect by Letters Patent, is—

1. The combination of a mixer for the coating material provided with stirring means, a reservoir for storing the coating material, a coating-machine for mixing the material to be coated and the coating material, steam jackets or coils for maintaining the temperature of the contents of the mixer, reservoir and coating-machine, substantially as herein described.

2. The combination of a mixer for the coating material, stirring means therein, a reservoir for the coating material, heating-coils in said mixer and reservoir, and a coating-machine, said machine having a steam-jacket and arms revolving within it, substantially as herein described.

3. The combination of a mixer for the coating material, a coating-machine, said machine having a steam-jacket, arms revolving within the machine, a drainer for removing excess of coating material and an outlet-chute for the coated macadam, substantially as herein described.

4. A tar-macadam-coating machine comprising a drum surrounded by a steam-jacket an inlet at or near one end and an outlet at or near the other end of said drum, a shaft revolving inside said drum, screw-blades upon such shaft, a steam-inlet to the steam-jacket, an outlet from the jacket for condensed steam, a grating toward the outlet end of the drum for removing excess of coating material, substantially as herein described.

5. The combination of a mixer for the coating material, a coating-machine, a reservoir, steam-coils in such mixer and reservoir, an agitated chute for delivering the material to a coating-machine, said coating-machine having a steam-jacket, renewable bottom and revolving arms, substantially as herein described.

6. A tar-macadam-coating machine, comprising a drum, a steam-jacket surrounding same, an inlet at or near one end and an outlet at or near the other end of said drum, a shaft revolving in said drum and screw-blades upon said shaft, the said blades being of curved shape in section and being adapted to mix the materials in the drum and traverse them to the outlet, as set forth.

In testimony whereof I have signed my name to this specification in the presence of two subscribing witnesses.

E. PURNELL HOOLEY.

Witnesses:
 ERNEST MILLER,
 WILLIAM H. POTTER.